(12) United States Patent
Yun et al.

(10) Patent No.: US 11,082,903 B2
(45) Date of Patent: Aug. 3, 2021

(54) METHOD FOR HANDOVER IN NON-TERRESTRIAL NETWORK, AND APPARATUS FOR THE SAME

(71) Applicant: ELECTRONICS AND TELECOMMUNICATIONS RESEARCH INSTITUTE, Daejeon (KR)

(72) Inventors: Mi Young Yun, Daejeon (KR); Ji Hyung Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 16/699,357

(22) Filed: Nov. 29, 2019

(65) Prior Publication Data

US 2020/0178135 A1 Jun. 4, 2020

(30) Foreign Application Priority Data

Dec. 3, 2018 (KR) .................. 10-2018-0153930
Dec. 10, 2018 (KR) .................. 10-2018-0158560

(Continued)

(51) Int. Cl.
*H04W 36/08* (2009.01)
*H04W 36/00* (2009.01)
*H04B 7/185* (2006.01)

(52) U.S. Cl.
CPC ........ *H04W 36/08* (2013.01); *H04B 7/18541* (2013.01); *H04W 36/0058* (2018.08); *H04W 36/0061* (2013.01)

(58) Field of Classification Search
None
See application file for complete search history.

(56) References Cited

U.S. PATENT DOCUMENTS 9,888,426 B2  2/2018 Ulupinar et al.
10,057,869 B2  8/2018 Ryu et al.
(Continued)

FOREIGN PATENT DOCUMENTS

KR  101467122 B1  12/2014
WO  2017183897 A1  10/2017
WO  2018030684 A1  2/2018

OTHER PUBLICATIONS

Google Translation of Park et al, International Patent Application Publication No. WO 2017183897 A1 (Year: 2017).*

(Continued)

*Primary Examiner* — Chi H Pham
*Assistant Examiner* — Vladislav Y Agureyev
(74) *Attorney, Agent, or Firm* — Rabin & Berdo, P.C.

(57) ABSTRACT

A handover method performed by a terminal in a non-terrestrial network may comprise transmitting a measurement report including measurement results for neighbor cells to a serving satellite base station; receiving, from the serving satellite base station, connection configuration information for at least one target base station candidate and information on an activation time when the connection configuration information for the at least one target base station candidate is activated; and performing a handover to a first target base station candidate among the at least one target base station candidate based on information received from the at least one target base station candidate at the activation time.

17 Claims, 7 Drawing Sheets

(30) Foreign Application Priority Data

Nov. 25, 2019 (KR) ........................ 10-2019-0152355
Nov. 25, 2019 (KR) ........................ 10-2019-0152363

(56) References Cited

U.S. PATENT DOCUMENTS

| | | | |
|---|---|---|---|
| 10,079,636 B2 | 9/2018 | Buer et al. | |
| 10,200,921 B2 | 2/2019 | Li et al. | |
| 2015/0024677 A1* | 1/2015 | Gopal | H04L 67/12 |
| | | | 455/13.1 |
| 2015/0038148 A1* | 2/2015 | Park | H04W 36/08 |
| | | | 455/437 |
| 2015/0162977 A1 | 6/2015 | Park et al. | |
| 2015/0181476 A1* | 6/2015 | Yang | H04W 16/14 |
| | | | 370/331 |
| 2015/0271730 A1* | 9/2015 | Benammar | H04W 36/30 |
| | | | 455/436 |
| 2015/0334625 A1* | 11/2015 | Banks | H04W 36/08 |
| | | | 455/440 |
| 2017/0041830 A1* | 2/2017 | Davis | H04B 7/1851 |
| 2017/0105153 A1* | 4/2017 | Ashrafi | H04W 36/245 |
| 2017/0215119 A1 | 7/2017 | Hong et al. | |
| 2017/0230104 A1* | 8/2017 | Purkayastha | H04W 48/20 |
| 2017/0311278 A1 | 10/2017 | Adjakple et al. | |
| 2018/0074208 A1 | 3/2018 | Ravishankar et al. | |
| 2018/0115930 A1 | 4/2018 | Belleschi et al. | |
| 2018/0234901 A1* | 8/2018 | Suh | H04W 36/32 |
| 2018/0376392 A1 | 12/2018 | Wu et al. | |
| 2019/0045419 A1 | 2/2019 | Shrestha et al. | |
| 2019/0075468 A1* | 3/2019 | Fujii | H04W 28/08 |
| 2019/0104452 A1 | 4/2019 | Park | |
| 2019/0230568 A1* | 7/2019 | Arur | H04B 7/2041 |
| 2019/0230569 A1 | 7/2019 | Kim et al. | |
| 2020/0196263 A1* | 6/2020 | Heyn | H04W 56/0005 |
| 2020/0313755 A1* | 10/2020 | Chuang | H04L 5/0048 |
| 2020/0314914 A1* | 10/2020 | Roy | H04W 36/0072 |
| 2020/0389831 A1* | 12/2020 | Mackenzie | H04W 36/08 |

OTHER PUBLICATIONS

Etri, "Mobility aspects for NTN", 3GPP TSG RAN WG2 meeting #105; R2-1902127, Feb. 25-Mar. 1, 2019, pp. 1-3.

Etri, "Considerations on satellite location sharing", 3GPP RAN WG2 meeting #107; R2-1911424, Aug. 26-Aug. 30, 2019, pp. 1-2.

* cited by examiner

METHOD FOR HANDOVER IN NON-TERRESTRIAL NETWORK, AND APPARATUS FOR THE SAME

CROSS-REFERENCE TO RELATED APPLICATIONS

This application claims priority to Korean Patent Applications No. 10-2018-0153930 filed on Dec. 3, 2018, No. 10-2018-0158560 filed on Dec. 10, 2018, No. 10-2019-0152355 filed on Nov. 25, 2019, and No. 10-2019-0152363 filed on Nov. 25, 2019 in the Korean Intellectual Property Office (KIPO), the entire contents of which are hereby incorporated by reference.

BACKGROUND

1. Technical Field

The present disclosure relates to non-terrestrial networks (NTNs), and more particularly, to a method for receiving satellite information in the NTN, a method for supporting handover in the NTN, and a method for performing handover in the NTN, and apparatuses for the same.

2. Related Art

There is a need to develop mobile satellite communication technologies to prepare for disruption of communication that may occur in cellular network shadow areas such as mountainous areas, desert areas, islands, and oceans and terrestrial network collapsed areas due to earthquakes, tsunamis, and wars. The satellite communication network is maintained even when the terrestrial network is collapsed due to disasters, so that the area where the disasters occur can be connected to the outside, and individual survival and safety can be maintained.

In addition, the necessity of mobile satellite communication technologies is increasing for construction of a hyper-connected society that provides mobile communication services even in areas where communication has not been possible in the past, such as mountains and remote areas without a communication infrastructure. In the 3rd generation partnership project (3GPP), based on 5G new radio (NR) technology, standardization of non-terrestrial networks (NTNs) using a non-terrestrial base station (e.g., a base station using an airborne platform such as a satellite base station or an airship) is being progressed.

In case of the NTN based on the 5G NR technology, when a non-terrestrial base station is a satellite base station, there is a need for a method for transferring satellite information to a terminal for various services. In addition, mobility of a non-geostationary satellite is classified into two types, an earth-fixed beam and a moving beam. The earth-fixed beam does not change a ground cell even if the satellite moves, and the moving beam means that cell information changes together with the moving satellite. The moving beam causes frequent handovers due to the movement of the satellite even though the terminal does not move. For this reason, there is a problem in that the power consumption of the terminal is increased.

SUMMARY

Accordingly, exemplary embodiments of the present disclosure provide a method for receiving satellite information in an NTN. Accordingly, exemplary embodiments of the present disclosure also provide a method for supporting handover in an NTN. Accordingly, exemplary embodiments of the present disclosure also provide an apparatus for performing the above-described methods. Accordingly, exemplary embodiments of the present disclosure also provide a handover method performed by a terminal in an NTN. Accordingly, exemplary embodiments of the present disclosure also provide a method for supporting handover of a terminal, performed by a serving satellite base station in an NTN.

According to exemplary embodiments of the present disclosure, a handover support method, performed by a first base station connected to a first satellite, may comprise providing identification information of a second satellite, which is to provide services to terminals, to the terminals being served; transmitting connection and security information of the terminals to a second base station connected to the second satellite; and providing the terminals with preliminary information related to a change from the first satellite to the second satellite. Here, the preliminary information may include information on a service interruption time and/or a service resumption time, and the service interruption time and/or service resumption time may be represented by using a system frame number (SFN), a coordinated universal time (UTC), or a GPS time.

Furthermore, according to exemplary embodiments of the present disclosure, a handover method, performed by a terminal in a non-terrestrial network, may comprise transmitting a measurement report including measurement results for neighbor cells to a serving satellite base station; receiving, from the serving satellite base station, connection configuration information for at least one target base station candidate and information on an activation time when the connection configuration information for the at least one target base station candidate is activated; and performing a handover to a first target base station candidate among the at least one target base station candidate based on information received from the at least one target base station candidate at the activation time.

The measurement report may include location information of the terminal, and the serving satellite base station may determine the at least one target base station candidate based on the location information of the terminal and orbit information of neighbor satellite base stations.

The location information of the terminal may be at least one of global positioning system (GPS) location information, assisted global navigation satellite system (A-GNSS) location information, information based on an observed time differential of arrival (OTDOA), and an enhanced cell ID (ECID).

The orbit information of the neighbor satellite base stations may be ephemeris information of satellites on which the neighbor satellite base stations are mounted.

The handover method may further comprise transmitting information on remaining target base station(s) except the first target base station candidate among the at least one target base station candidate to the first target base station.

The handover to the first target base station candidate may be performed without an additional control signaling for the handover.

The serving satellite base station and the at least one target base station candidate may be moving beam type satellite base stations.

The activation time may be represented using at least one of a system frame number (SFN), a coordinated universal time (UTC), and a GPS time.

Furthermore, according to exemplary embodiments of the present disclosure, a method of supporting a handover of a terminal, performed by a serving satellite base station in a non-terrestrial network, may comprise receiving a measurement report including measurement results for neighbor cells from the terminal; determining at least one target base station candidate based on the measurement report, and receiving connection configuration information from the at least one target base station candidate; and transmitting, to the terminal, connection configuration information for the at least one target base station candidate and information on an activation time when the connection configuration information for the at least one target base station candidate is activated.

The measurement report may include location information of the terminal, and the serving satellite base station may determine the at least one target base station candidate based on the location information of the terminal and orbit information of neighbor satellite base stations.

The location information of the terminal may be at least one of global positioning system (GPS) location information, assisted global navigation satellite system (A-GNSS) location information, information based on an observed time differential of arrival (OTDOA), and an enhanced cell ID (ECID).

The orbit information of the neighbor satellite base stations may be ephemeris information of satellites on which the neighbor satellite base stations are mounted.

The method may further comprise, when reconnection configuration for maintaining connection is requested from the terminal, receiving information on the at least one target base station candidate from the terminal and notifying the at least one target base station candidate that the terminal is not handed over to the at least one target base station candidate.

The serving satellite base station and the at least one target base station candidate may be moving beam type satellite base stations.

Furthermore, according to exemplary embodiments of the present disclosure, a handover method performed by a terminal in a non-terrestrial network may comprise transmitting a measurement report including measurement results for neighbor cells to a serving satellite base station; receiving, from the serving satellite base station, connection configuration information for a first base station and information on an activation time when the connection configuration information for the first base station is activated; and when receiving information of a second base station that is different from the first base station at the activation time, performing a handover to the second base station by proceeding with a connection configuration procedure with the second base station.

The measurement report may include location information of the terminal, and the serving satellite base station may determine the first base station based on the location information of the terminal and orbit information of neighbor satellite base stations.

The location information of the terminal may be at least one of global positioning system (GPS) location information, assisted global navigation satellite system (A-GNSS) location information, information based on an observed time differential of arrival (OTDOA), and an enhanced cell ID (ECID).

The orbit information of the neighbor satellite base stations may be ephemeris information of satellites on which the neighbor satellite base stations are mounted.

The handover method may further comprise transmitting information on the first base station to the second base station, wherein the second base station notifies the first base station that the terminal is not handed over to the first base station based on the information on the first base station.

The serving satellite base station, the first base station, and the second base station may be moving beam type satellite base stations.

According to the exemplary embodiments of the present disclosure, since the base station provides the terminal with preliminary information related to the satellite change in advance (e.g., information on the satellites that will provide services, service interruption time, and/or service resumption time), the service interruption and signaling overhead of the terminal can be minimized. In addition, according to the exemplary embodiment of the present disclosure, a terminal without a GPS receiver can also receive orbit information (ephemeris) for the satellite from a terrestrial base station. Therefore, various types of terminals can operate efficiently in the non-terrestrial network. In addition, using the exemplary embodiments of the present disclosure, the signaling overhead caused by frequent handovers in the non-terrestrial network system can be reduced, thereby ensuring smooth operation of the system.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
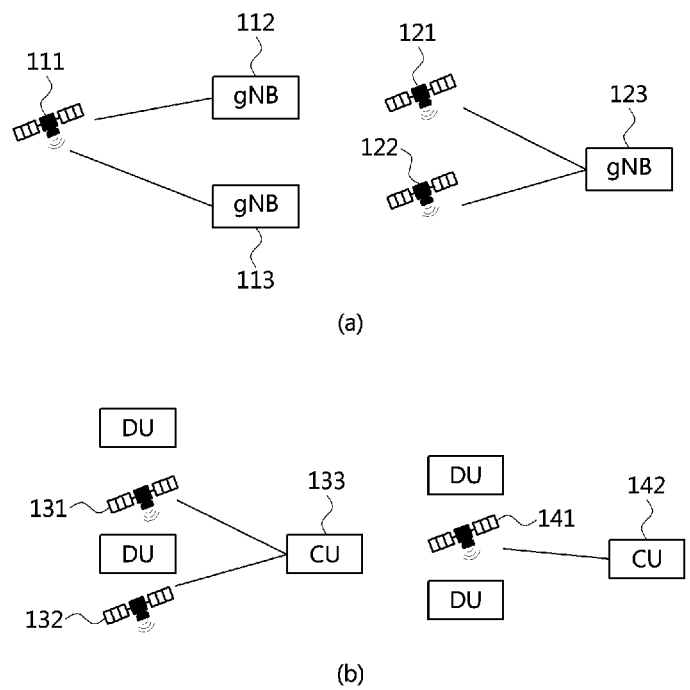
FIG. 1 is a conceptual diagram illustrating communication environments to which exemplary embodiments of the present disclosure are applied.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks. Here, the wireless communication network may be used in the same sense as a wireless communication system.

Hereinafter, for convenience of description, the term 'satellite base station' is used as a term representing a non-terrestrial base station or a mobile base station. However, the methods and apparatuses described below may be applied not only to satellite base stations but also to base stations using airborne platforms, such as airships.

FIG. 1 is a conceptual diagram illustrating communication environments to which exemplary embodiments of the present disclosure are applied.

Referring to (a) of FIG. 1, in an NTN for which standardization is being performed in the 3GPP, satellites 111, 121, and 122 may serve as relays while base stations (e.g., gNBs) 112, 113, and 123 are on the ground. That is, in this case, the satellite base station operates as a transparent node defined in the 3GPP NTN.

Referring to (b) of FIG. 1, central units (CUs) 133 and 142 of the base station may be located on the ground, and a distributed unit (DU) of the base station may be located at each of satellites 131, 132, and 141. Alternatively, the base station (e.g., gNB) itself may be located in the satellite. That is, in this case, the satellite base station operates as a regenerative node defined in the 3GPP NTN.

One or more NR cells may be defined through one satellite. In addition, one gNB may provide services through one or more satellites. The satellite may be classified as a low earth orbit (LEO) satellite, a medium earth orbit (MEO) satellite, or a geostationary equatorial orbit (GEO) satellite.

Meanwhile, as shown in Table 1 below, a delay between the satellite base station and the terminal may vary greatly according to the altitude of the satellite.

TABLE 1

| | UE to satellite delay [ms] | | One-Way Max propagation delay [ms] |
| --- | --- | --- | --- |
| | Min | Max | |
| LEO | 3 | 15 | 30 |
| MEO | 27 | 43 | 90 |
| GEO | 120 | 140 | 280 |

When the terminal knows the type (e.g., LEO, MEO, or GEO) of the satellite and the orbit of the satellite, the terminal can infer an elevation angle with the satellite and a distance from the satellite. Since the type and orbit of the satellite have a great influence on a signal delay and a signal strength between the terminal and the satellite base station, knowing the type and orbit of the satellite may help the terminal in various control procedures such as initial access, handover, and paging. Therefore, in the following, methods of receiving information on satellites by a terminal according to exemplary embodiments of the present disclosure will be described.

Methods for Receiving Satellite Information

The present disclosure relates to methods of delivering satellite information (satellite type and orbit information) to a terminal in an NTN system based on the 5G NR system.

One of the methods of distinguishing the type of satellite is to set a physical cell ID (PCID) of the satellite in advance according to the type (e.g., GEO, MEO, or LEO) of the satellite. As an example, PCIDs of a first range are applied to satellite base stations of the GEO type, PCIDs of a second range are applied to satellite base stations of the MEO type, and PCIDs of a third range are applied to satellite base stations of the LEO type. Information on the PCIDs for each satellite type may be predefined in the standard or preconfigured in the terminal through higher layer signaling (e.g., radio resource control (RRC) signaling). The terminal may identify the type of the satellite only by identifying the PCID of the satellite base station, and may predict a delay between the base station and the terminal.

If the delay between the satellite and the terminal can be predicted, performance degradation caused by the long delay between the terminal and the satellite may be prevented. If the terminal knows the type of satellite before accessing the satellite, the power consumption of the terminal can be reduced, and it may be helpful for fast cell selection.

If the delay is not to be predicted and only the satellite type is to be distinguished, the satellite base station may broadcast its type (e.g., GEO, MEO, or LEO) by setting it to 2 bits or 1 bit in a system information block 1 (SIB1). When the terminal has a type not capable of accessing the GEO in a cell selection process, there is an advantage in that the terminal can make a quick determination by using only the SIB.

Since not only the type of satellite but also the orbit of the satellite affect signal delay and signal strength/beam management, there is a need for providing a terminal with information on the orbit of the satellite (e.g., ephemeris information). The 'satellite information' may include not only the type of satellite but also a satellite number (i.e., catalog number) and an orbit (altitude/longitude/latitude) over time. In case of a terminal having a global positioning system (GPS) receiver (or, global navigation satellite system (GNSS) receiver), the terminal may restrict satellites whose signals the terminal can receive at its own location using the satellite orbit information. Exemplary embodiments of the present disclosure provide methods of mapping information on the satellite orbits and cell information in order to inform the terminal of a base station to which the satellite whose signal the terminal can receive is mapped.

Figure 2:
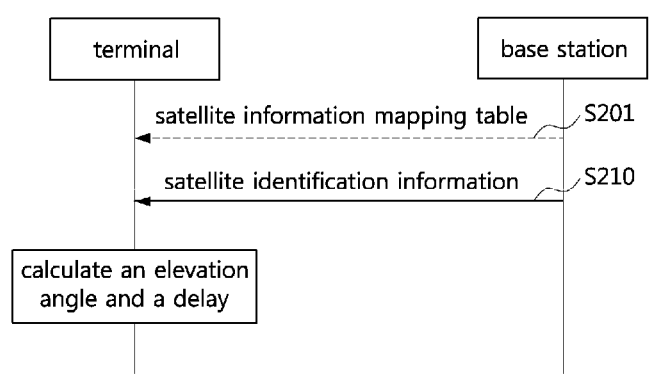
FIGS. 2 to 4 are sequence charts illustrating methods of receiving satellite information by a terminal according to exemplary embodiments of the present disclosure.
Figure 3:
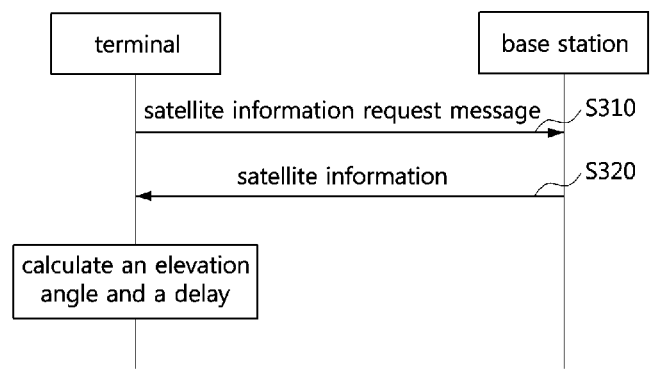
Figure 4:
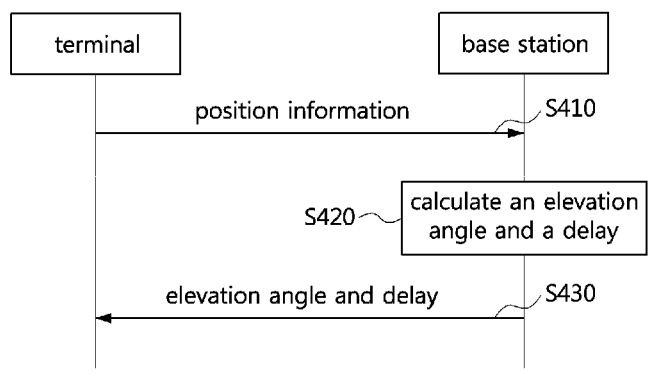

FIGS. 2 to 4 are sequence charts illustrating methods of receiving satellite information by a terminal according to exemplary embodiments of the present disclosure.

Referring to FIG. 2, in an exemplary embodiment, the base station may broadcast satellite identification information associated with a cell that is currently serviced through system information (SI) for 5G satellites (S210). The satellite identification information may have a mapping relationship with satellite ephemeris information (e.g., satellite number, date of manufacture, orbit information). As the satellite identification information, a unique number of the satellite (e.g., catalog number) or identification information predefined in the system may be used.

Meanwhile, before the step S210, the terminal may receive in advance a satellite information mapping table including satellite ephemeris information mapped to the satellite identification information by accessing a terrestrial network belonging to the same public land mobile network (PLMN) or a roamable PLMN (S201). That is, the satellite information mapping table may be previously received by the terminal through higher layer signaling (e.g., RRC signaling). Alternatively, the satellite information mapping table mapped with the satellite identification information may be pre-configured or downloaded in advance to the terminal. Alternatively, the satellite information mapping table mapped with the satellite identification information may be updated by a network with timer-based or revision number-based non-access stratum (NAS) messages or traffic. The terminal may acquire orbit information of a satellite that is currently providing services by using the satellite identification information received through system information, and infer the location of the satellite that is currently providing services by using the time of the terminal and the acquired orbit information of the satellite.

When the terminal knows its location, the terminal may calculate the elevation angle with the satellite and infer the distance from the satellite by using the orbit information of the satellite. Also, it may be helpful for adjusting a signal delay (i.e., timing advance) and a beam direction. On the other hand, when the GPS is not provided or when the GPS is not available, the terminal may acquire its location information by using a system or scheme such as assisted GNSS (A-GNSS), observed time differential of arrival (OTDOA), and enhanced cell ID (E-CID).

Referring to FIG. 3, in another exemplary embodiment, when the base station provides a non-terrestrial access service but does not transmit the satellite identification information through system information, when the terminal does not have the satellite information mapping table mapped to the satellite identification information, or when the terminal does not know its location, the terminal may request satellite information directly to the base station.

That is, the terminal may transmit a satellite information request message to the base station (S310). The base station receiving the satellite information request message from the terminal may transmit the corresponding satellite information mapping table and/or satellite orbit information to the terminal (S320). The terminal receiving the satellite orbit information may calculate an elevation angle and a delay with the satellite. The satellite information request message transmitted from the terminal to the base station and the orbit information of the satellite transmitted from the base station to the terminal may use higher layer signaling.

Referring to FIG. 4, in yet another exemplary embodiment, when the base station provides a non-terrestrial access service but does not transmit the satellite identification information through system information, when the terminal does not have the satellite information mapping table mapped to the satellite identification information, or when the terminal is a low power terminal not capable of calculating an elevation angle and a delay with the satellite, the terminal may request the base station to calculate the elevation angle and the delay.

That is, when the terminal reports its location information (e.g., obtained using GPS or other positioning scheme) to the base station in a periodic or event manner (e.g., when the terminal moves more than a predetermined threshold) (S410), the base station may calculate the elevation angle of the terminal with the satellite and the delay between the terminal and the satellite (S420), and transfer the calculated elevation angle and delay to the terminal (S430). Alternatively, the terminal may update its location information to the base station in a periodic or event manner, and when configuring a bearer with the terminal, the base station may determine timer definitions and a retransmission scheme necessary for the bearer configuration by using the orbit information of the corresponding satellite, and configure them to the terminal. This scheme has an advantage that the terminal does not need to know the location information of the satellite.

Meanwhile, before being handed over to the NTN or before being connected to the NTN, the terminal may access a terrestrial access network and receive the satellite information and information on the NTN from the NTN in advance by using at least one of the above-described methods. For example, the terminal accessing the terrestrial access network may transmit a request for information on the non-terrestrial access network (including satellite information) to the terrestrial access network. In this case, the terminal may transmit its location information by including it in the request. If the terminal does not have its own location information, the terminal may transmit cell information of the currently accessed terrestrial access network by including it in the request. When the terrestrial access network can connect to the non-terrestrial access network, the terrestrial access network may transfer the request to the corresponding non-terrestrial access network. According to a system setting, the non-terrestrial base station connected to the satellite may transmit the orbit information of the satellite, or transfer values necessary for initial access and bearer configuration (e.g., various timers and window size) in advance by utilizing the satellite location information and the terminal location information.

Methods for Supporting Handover

Meanwhile, the mobility of the non-geostationary satellite may vary depending on the beam type of the corresponding satellite (e.g., earth-fixed beam or moving beam). In an earth-fixed beam scenario, even if the satellite moves, the ground cell does not change. On the other hand, in a moving beam scenario, cell information may change as the satellite moves. The moving beam may cause frequent handovers due to the movement of the satellite even though the terminal does not move, thereby increasing power consumption of the terminal. On the other hand, in the earth-fixed beam scenario, cell is not changed even when the satellite moves, and thus it is needed to minimize the influence on the terminals connected to the existing cell.

Figure 5:
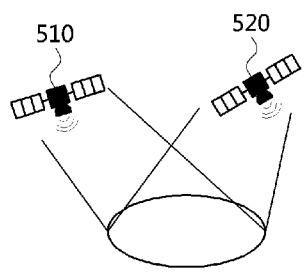
FIG. 5 is a conceptual diagram illustrating a handover support method for a satellite base station according to an exemplary embodiment of the present disclosure.

FIG. 5 is a conceptual diagram illustrating a handover support method for a satellite base station according to an exemplary embodiment of the present disclosure.

As shown in FIG. 5, in the earth-fixed beam scenario, the cell may be fixed to the ground. Even when the satellite serving one cell is changed from a satellite 510 to a satellite 520, if the cell information (e.g., PCID, synchronization signal block (SSB), etc.) remains the same, the terminal may receive services without reconfiguration. Therefore, a method for reducing overhead caused even when the terminal does not move, such as change of system information due to the mobility of the non-geostationary satellite, will be proposed.

As described above, when only satellite identification information of a satellite currently being in service is transmitted through system information, if a satellite serving a corresponding region is changed due to the mobility of the satellite, a system information update procedure should be performed. This may cause overhead in the system that active or idle state terminals present in the cell should simultaneously identify the changed system information. In order to prevent this, since the base station knows in advance the satellite that will serve a specific area, the base station may include satellite identification information of the satellite that is to provide services to the corresponding cell in the system information. The terminal may identify the satellite to provide services to the corresponding area (cell) by using the satellite identification information of the satellite to provide services and a current time and location of the terminal.

(Example of System Information for Satellite-Based Mobile Base Station)

Satellite identification information: In case of the earth-fixed beam scenario, the satellite identification information of the satellite that is going to serve the corresponding area (cell) (or a list of the satellite identification information of satellites that are going to serve the corresponding area (cell)) is included.

The terminal may attempt to access by inferring the satellite currently providing services to the terminal based on the satellite identification information received through the system information. However, in order to provide accurate information, the base station may provide the terminal with information (i.e., satellite identification information) of the satellite currently providing services to the terminal through connection configuration information using a dedicated channel.

Meanwhile, a satellite A and a satellite B may be connected to the same base station or may be connected to different base stations.

Figure 6:
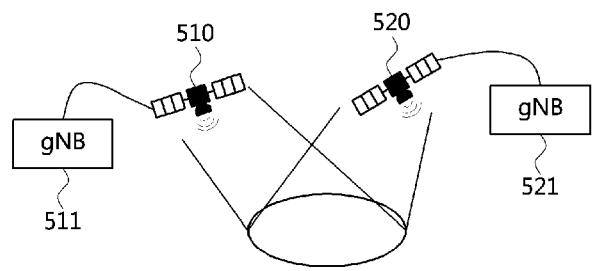
FIG. 6 is a conceptual diagram illustrating a handover support method for a satellite base station according to another exemplary embodiment of the present disclosure.

FIG. 6 is a conceptual diagram illustrating a handover support method for a satellite base station according to another exemplary embodiment of the present disclosure.

Referring to FIG. 6, a satellite 510 and a satellite 520 may be connected to different base stations 510 and 520. On the other hand, when a DU is installed in each of the satellites 510 and 520, each of the base stations 511 and 521 may be a CU. The base station 511, which knows the orbits of the satellites in advance and is connected to the satellite 510, may predict the movement of the satellites, and transmit connection and security information of terminals (including active and inactive terminals) connected to it to the base station 521 connected to the next satellite 520 through the current satellite 510.

The new base station 521 may need a time for reconfiguring cell information and user information according to the information received from the base station 511. A service interruption is expected while reconfiguring with new cell information at the new base station 521. That is, it is necessary to inform that there is no transmission and reception at all while the satellite is being changed, and no signal is transmitted from the base station.

The present disclosure proposes a scheme in which a base station provides preliminary information (e.g., service interruption time and/or service resumption time) related to the satellite change to terminals in order to minimize service interruption and signaling overhead of the terminal. Since the time taken to change the satellite may vary according to a connection structure between the satellite and the base station, two schemes are proposed as a method for informing the service interruption time and/or the service resumption time. The two schemes include a first scheme of using system information or a dedicated signal, and a second scheme of using a paging message.

(1) Scheme of Using System Information or Dedicated Signal

The base station (e.g., the base station 511) may inform the existing terminals (including connected terminals, idle terminals, and inactive terminals) of a time point of changing the satellite, a time (e.g., system frame number (SFN), coordinated universal time (UTC), or GPS time) required to change the satellite, a time point of resuming the service, or an estimated time (e.g., SFN, UTC, or GPS time) required to resume the service by using system information or a dedicated signal.

The terminals may receive the system information or the dedicated signal, and anticipate temporary service interruption due to the satellite change. Accordingly, the terminal may not recognize a system error even if system information and data transmission are stopped during the corresponding time. In addition, the terminal may recognize the change of the satellite, and by performing a beam tracking according to the orbit of the new satellite 520, the terminal may minimize the service interruption.

(2) Scheme of Using Paging Message

When information on the service interruption time is transmitted as system information, an overhead in which all terminals need to receive system information again whenever the information on the service interruption time is changed. In order to prevent this, a method of transmitting information on the service interruption time by including it in a paging message may be possible. The paging message may include the time point of changing the satellite, the time (e.g., SFN, UTC, or GPS time) required to change the satellite, the time point of resuming the service, or the estimated time (e.g., SFN, UTC, or GPS time) required to resume the service. The satellite identification information of the satellite currently providing services and/or the satellite identification information of the next satellite predicted to provide services may be optionally included in the paging message.

In particular, a method of representing the time point at which the satellite is changed or the time duration required to change the satellite by SFN is as follows. The time point at which the service interruption is started may be defined by an SFN and a subframe number. In case that the time duration of the service interruption is defined within a system frame in which the service interruption is started, the time duration may be defined only by a subframe number. On the other hand, when the time duration of the service interruption is longer than one system frame or when the time duration of the service interruption ends in the next system frame, the time duration of the service interruption may be defined by an SFN and a subframe number. In addition, since the orbit of the satellite is predetermined and the interval is constant, the satellite change may occur repeatedly, so that a repetition time may be defined, and the terminal may apply it through a modular operation with a Hyper Frame Number (HFN).

Figure 7:
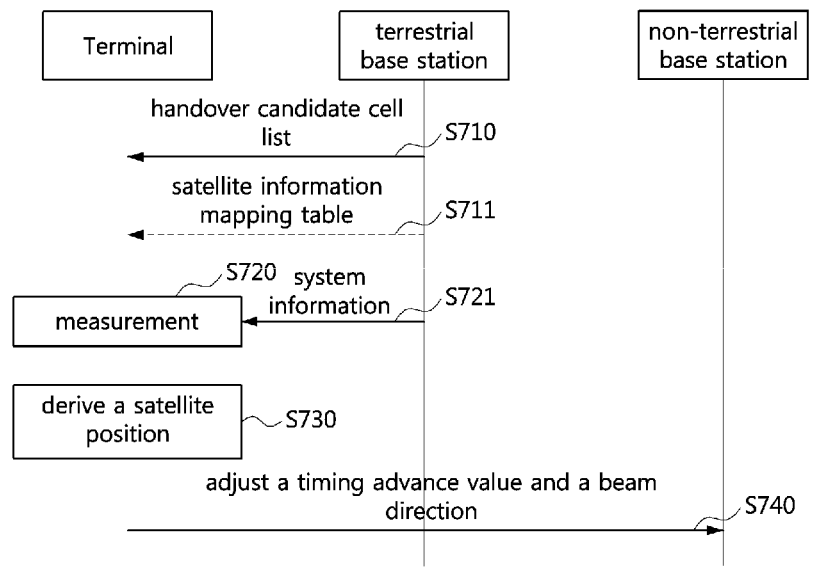
FIG. 7 is a sequence chart illustrating a handover method from a terrestrial network to a non-terrestrial network according to an exemplary embodiment of the present disclosure.

Example of system information for satellite-based mobile base station
- Satellite identification information: satellite identification information of a satellite which is currently providing services (optional)
- Satellite identification information: satellite identification information of a next satellite to provide services (optional)
- Time point at which a satellite is changed (SFN/subframe, UTC, or GPS time)
- Time required for changing a satellite
- Repetition time Example of paging message for satellite-based mobile base station
- Satellite identification information: satellite identification information of a satellite which is currently providing services (optional)
- Satellite identification information: satellite identification information of a next satellite to provide services (optional)
- Time point at which a satellite is changed (SFN/subframe, UTC, or GPS time)
- Time required for changing a satellite
- Repetition time Example of Satellite Information Mapping Table
- Satellite identification information—satellite number
- Satellite number—satellite name, satellite orbit, and the like Handover Method Between Terrestrial Network and Non-Terrestrial Network FIG. 7 is a sequence chart illustrating a handover method from a terrestrial network to a non-terrestrial network according to an exemplary embodiment of the present disclosure.

As shown in FIG. 7, a terminal may establish a connection with a terrestrial network base station, and receive a service from the terrestrial network base station. That is, the terrestrial network base station is a serving base station for the terminal.

The terrestrial network base station and the terminal may share a handover candidate cell list including at least one non-terrestrial network base station as a handover candidate (S710). In FIG. 7, although it is illustrated that the terrestrial network base station transmits the handover candidate cell list to the terminal, the handover candidate cell list may be shared in the following two schemes. Meanwhile, when a satellite on which a part of the base station or the entire base station is mounted moves (i.e., moving beam scenario), neighbor cells of the terrestrial network base station may be changed over time.

1. When the terrestrial network base station periodically updates information on the neighbor non-terrestrial network base stations, the terrestrial network base station may transmit to the terminal the handover candidate cell list including at least one non-terrestrial network base station as a handover candidate.
2. When the terrestrial network base station does not know the information on the neighbor non-terrestrial network base stations, the terminal may report the information by including the information of the neighbor non-terrestrial network base stations in a measurement result. The terrestrial network base station may perform connection configuration with the non-terrestrial base station through another non-terrestrial network base station or non-terrestrial network using the reported information on the neighbor non-terrestrial network base stations. The terrestrial network base station may transmit to the terminal the handover candidate cell list including at least one non-terrestrial network base station as a handover candidate.

In this case, the handover candidate cell list may include the following contents for the non-terrestrial network base station.

Satellite identification information

The satellite identification information is identification information of the satellite, which has a mapping relationship with satellite ephemeris information (e.g., satellite number, date of manufacture, orbit information). As the satellite identification information, a unique number of the satellite (e.g., catalog number), identification information predefined in the system, or a part of the satellite ephemeris information may be used.
- Type of satellite beam: earth-fixed beam or moving beam
- Base station physical layer information: identifier (physical cell ID or PCID), center frequency, beam configuration information The terminal may perform measurements on the neighbor cells using the handover candidate cell list (S720). The terminal should be able to perform measurements for neighbor base stations using the same frequency as that of the current serving base station or using a different frequency from that of the current serving base station. The terminal may receive system information of the base station belonging to the non-terrestrial network while performing the measurements (S721).

The system information may include satellite identification information of a satellite associated with a cell currently being serviced. The satellite identification information may have a mapping relationship with satellite information including ephemeris information (satellite number, date of manufacture, orbit information) of the satellite. The terminal may previously receive a satellite information mapping table including the satellite information mapped to the satellite identification information through higher layer signaling (e.g., RRC signaling) from a terrestrial network belonging to the same PLMN or a roamable PLMN (S711). Alternatively, the satellite information mapping table may be preconfigured in the terminal. The terminal may acquire orbit information of the satellite from the satellite information mapping table by using the satellite identification information received through system information, and the location of the satellite currently providing services using the time of the terminal and the acquired orbit information of the satellite (S730).

When the terminal knows its location, the terminal may infer an elevation angle with the satellite and a distance from the satellite by using the orbit information of the satellite. The terminal may adjust a signal delay time (e.g., timing advance) and a beam for the non-terrestrial network base station of the satellite by using the inferred elevation angle and distance (S740). However, even when the terminal does not know its own location, knowing at least the type of satellite and the approximate location of the satellite may be helpful for adjusting the delay time and the beam direction. The terminal may identify its location using a GPS receiver or a GNSS receiver. On the other hand, when the GPS is not provided or when the GPS is not available, the terminal may acquire its location information by using a system or scheme such as assisted GNSS (A-GNSS), observed time differential of arrival (OTDOA), and enhanced cell ID (E-CID).

Handover Method within Non-Terrestrial Network

Meanwhile, the mobility of the non-geostationary satellite may vary depending on the beam type of the corresponding satellite (e.g., earth-fixed beam or moving beam). In the earth-fixed beam scenario, even if the satellite moves, the ground cell does not change. On the other hand, in the moving beam scenario, cell information may change as the satellite moves. The moving beam may cause frequent handover due to the movement of the satellite even though the terminal does not move, thereby increasing power consumption of the terminal. On the other hand, in the earth-fixed beam scenario, cell is not changed even when the satellite moves, and thus it is needed to minimize the influence on the terminals connected to the existing cell.

Figure 8:
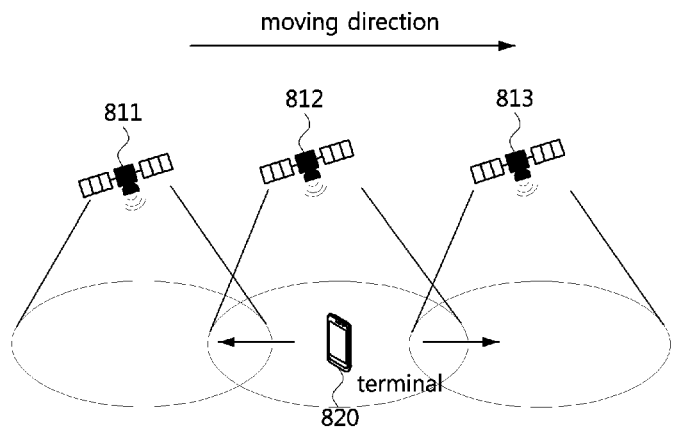
FIG. 8 is a conceptual diagram illustrating various situations that may occur in handover between non-terrestrial network base stations.

FIG. 8 is a conceptual diagram illustrating various situations that may occur in handover between non-terrestrial network base stations.

As shown in FIG. 8, satellites 811, 812, and 813 are moving in the same moving direction. As the satellites move along the predetermined orbits, their locations are predictable. Therefore, although the terminal 820 is currently being provided with services by the satellite base station 812, it is scheduled to be provided with services by the satellite base station 811 according to the passage of time. Also, the terminal may move at a high speed in the same direction as the moving direction of the satellite base station, but may move at a high speed in a different direction (e.g., the opposite direction) from the moving direction of the satellite base station. Hereinafter, various handover methods according to exemplary embodiments of the present disclosure will be described with reference to FIG. 8 in consideration of the mobility of terminal and satellite base stations.

Figure 9:
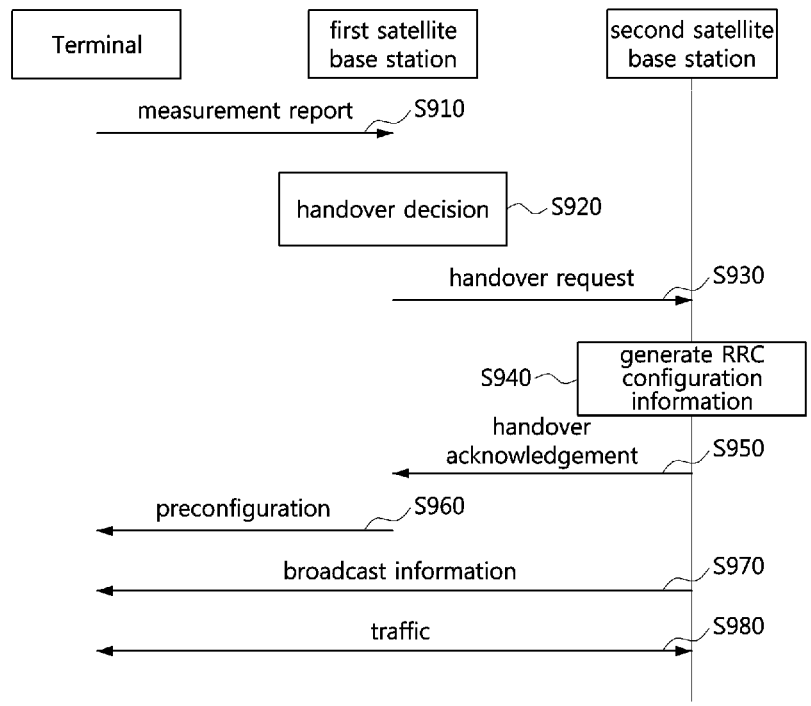
FIG. 9 is a sequence chart illustrating a handover method for a mobile satellite base station according to an exemplary embodiment of the present disclosure.

FIG. 9 is a sequence chart illustrating a handover method for a mobile satellite base station according to an exemplary embodiment of the present disclosure.

The exemplary embodiment described in FIG. 9 is to reduce the overhead of the handover procedure that occurs due to the mobility of the non-geostationary satellite even when the terminal (e.g., 820 of FIG. 8) does not move in the case of the moving beam scenario (i.e., when the cell information is fixed to the satellite).

Since the satellite base stations travel in a predetermined path, the satellite base stations (non-geostationary satellites) serving a specific area are predetermined. Accordingly, a satellite base station #1 (e.g., 812 of FIG. 8), which is the current serving base station, may know in advance a satellite base station #2 (e.g., 811 of FIG. 8) that will serve the area serviced by it based on information of the neighbor satellite base stations (e.g., 811 and 813 of FIG. 8).

The terminal may transmit measurement information of the neighbor cells periodically or aperiodically to the satellite base station #1 which is the current serving base station (S910). The reported measurement information may include signal strengths of the neighbor cells. In addition, the reported measurement information may include current location information of the terminal (e.g., GPS location information, information obtained through a system or scheme such as A-GNSS, OTDOA, or ECID) and a moving speed of the terminal.

Since the satellite base station #2, which is the next base station (i.e., target base station) of the terminal connected in the area currently served by the satellite base station #1, may be predetermined by the satellite orbit information, the serving base station may determine a handover of the terminal to the satellite base station #2 (S920). The serving base station may transmit a handover request message for requesting mobility support for the currently-connected terminal to the target base station (i.e., satellite base station #2) (S930).

Upon receiving the handover request message from the satellite base station #1, the satellite base station #2 may generate relevant connection configuration information (i.e., RRC configuration information) (S940), and may transmit a handover acknowledgment message including the generated connection configuration information to the satellite base station #1 (S950).

The satellite base station #1 may preconfigure the handover for the terminal according to the handover acknowledgement from the satellite base station #2 (S960). That is, in the step S960, the satellite base station #1 may transfer to the terminal information on the target base station (i.e., the satellite base station #2) and connection configuration information (including the connection configuration information received from the satellite base station #2 in the step S950) to be applied with respect to the satellite base station #2. In addition, in the step S960, the satellite base station #1 may inform an activation time when the connection configuration information transmitted to the terminal is activated.

First, the connection configuration information to be applied with respect to the satellite base station #2 may include beamforming information and a beam index identifier, resource allocation information of a control channel, a scheduling identifier, and the like. Next, the activation time may be expressed as an SFN, a UTC, or a GPS time. When the activation time is represented by the SFN, the time when the next satellite (i.e., satellite base station #2) is activated may be defined by an SFN and a subframe number. The information transferred to the terminal may be valid only for (the activation time when the new satellite base station is activated ±alpha). After the valid time expires, the terminal should perform a reconfiguration procedure with the satellite base station #2.

When information (e.g., PCID or satellite identification information included in system information) of the target base station received at the new connection activation time is the same as the preconfigured target base station information, the terminal may be handed over to the satellite base station #2 without an additional control signaling procedure, and may exchange traffic with the satellite base station #2 (S980).

In case of having the large service coverage, such as the satellite base station, the number of concurrently activated terminals may be large. Therefore, if all terminals transmit connection requests to the target base station at once as the satellite moves, a large overhead may occur. That is, since the moving speed of the satellite is larger than the moving speed of the terminal, and the terminal is likely to stay in the corresponding area even when the satellite (base station) moves, if the preconfigured target base station information matches the information of the new base station that is actually received, the terminal may be provided with services using the preconfigured information without additional procedures.

Figure 10:
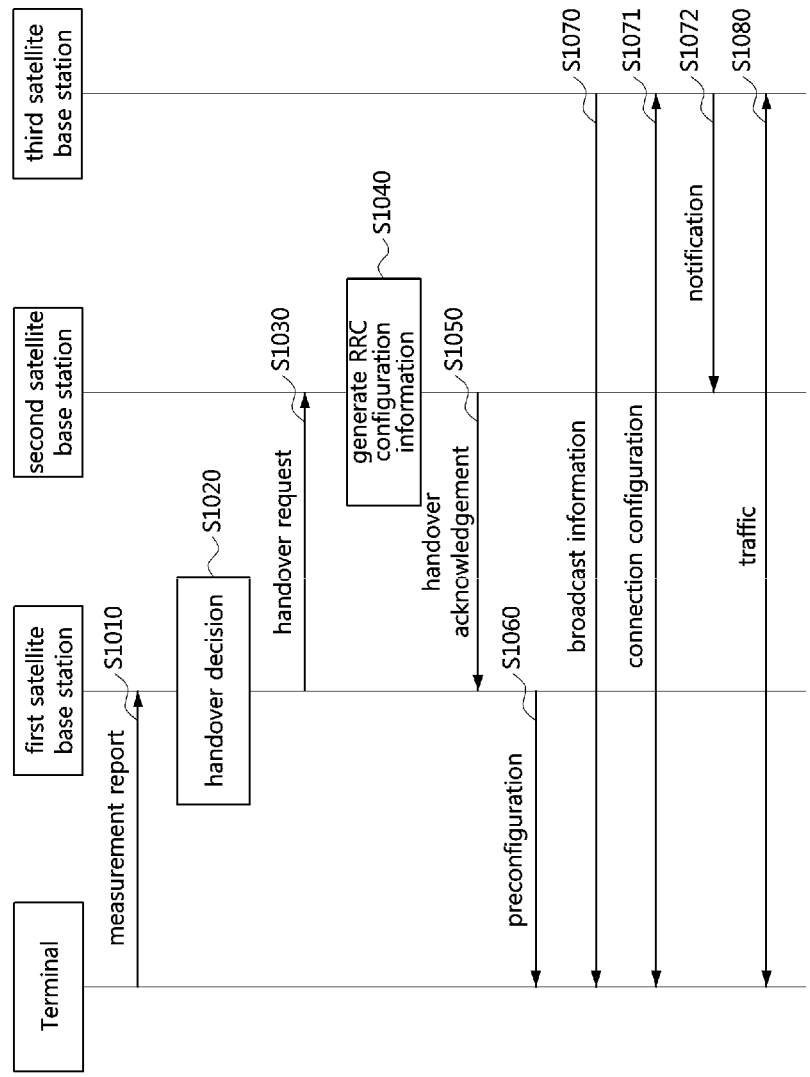
FIG. 10 is a sequence chart illustrating a handover method for a mobile satellite base station according to another exemplary embodiment of the present disclosure.

FIG. 10 is a sequence chart illustrating a handover method for a mobile satellite base station according to another exemplary embodiment of the present disclosure.

In the case of FIG. 9, only mobility of the satellite base stations is considered, but the terminal may also have high mobility. For example, when the terminal is located at the edge of the service coverage at the time when the target base station is activated, a situation may arise where services are provided from a satellite base station different from the preconfigured target base station due to the mobility of the terminal.

For example, referring to FIG. 8, when the terminal 820 moves in the same direction as the direction in which the satellite base station 812 currently providing services moves, it may not be necessary to handover to the satellite base station 811. In this case, the terminal may request the serving base station 812 to configure a connection for maintaining the connection with the serving base station 812. Although the serving base station 812 is a current serving base station of the terminal, since the serving base station has configured connections with terminals belonging to a new area due to the mobility of the base station, the connection between the terminal and the serving base station 812 should be reconfigured. In addition, the terminal may transmit information of the previously-configured target base station 811 to the current serving base station 812, and the current serving base station 812 may inform the previously-configured target base station 811 that the terminal is connected to itself (i.e., that the handover to the target base station 811 is not executed).

As another example, referring to FIG. 8, when the terminal 820 quickly moves in a different direction (i.e., direction out of the predetermined moving direction of the target base station 811) from the direction in which the satellite base station 812 currently providing the service moves, the target base station to which the terminal 820 actually accesses may be different from the previously-configured target base station 811. In this case, the terminal may request the new target base station to configure a connection. In this case, the terminal may transmit information of the previously-configured target base station to the current serving base station (i.e., the new target base station), and the current serving base station (i.e., the new target base station) may inform the previously-configured target base station 811 that the terminal is connected to another base station (i.e., that the handover to the target base station 811 is not executed).

Referring to FIG. 10, the terminal may perform a handover setup procedure for the predetermined target base station (i.e., satellite base station #2) according to the satellite orbit information with the satellite base station #1, which is the current serving base station (S1010 to S1060). That is, the steps S1010 to S1060 may be performed in the same manner as the steps S910 to S960 of FIG. 9.

However, the information of the target base station (e.g., PCID or satellite identification information included in system information) received at the activation time, which is received by the terminal in the step S1060, may not be the same as the information of the preconfigured target base station (i.e., satellite base station #2). For example, when the information of the target base station received (S1070) at the configured activation time indicates a satellite base station #3 instead of the satellite base station #2, the terminal may perform connection configuration with the satellite base station #3 instead of the satellite base station #2 (S1071).

In addition, the terminal may transmit information of the previously-configured target base station (i.e., satellite base station #2) to the satellite base station #3 which is the current serving base station, and the satellite base station #3 which is the current serving base station may inform the previously-configured target base station (i.e., satellite base station #2) that the terminal is connected to itself (i.e., that the handover to the satellite base station #2 is not executed) (S1072). Also, the terminal may exchange traffic with the current serving base station (satellite base station #3). Meanwhile, although FIG. 10 shows that the step S1080 is performed after the step S1072, the steps S1080 and S1072 may be simultaneously performed, or after the step S1080, the step S1072 may be performed.

Figure 11:
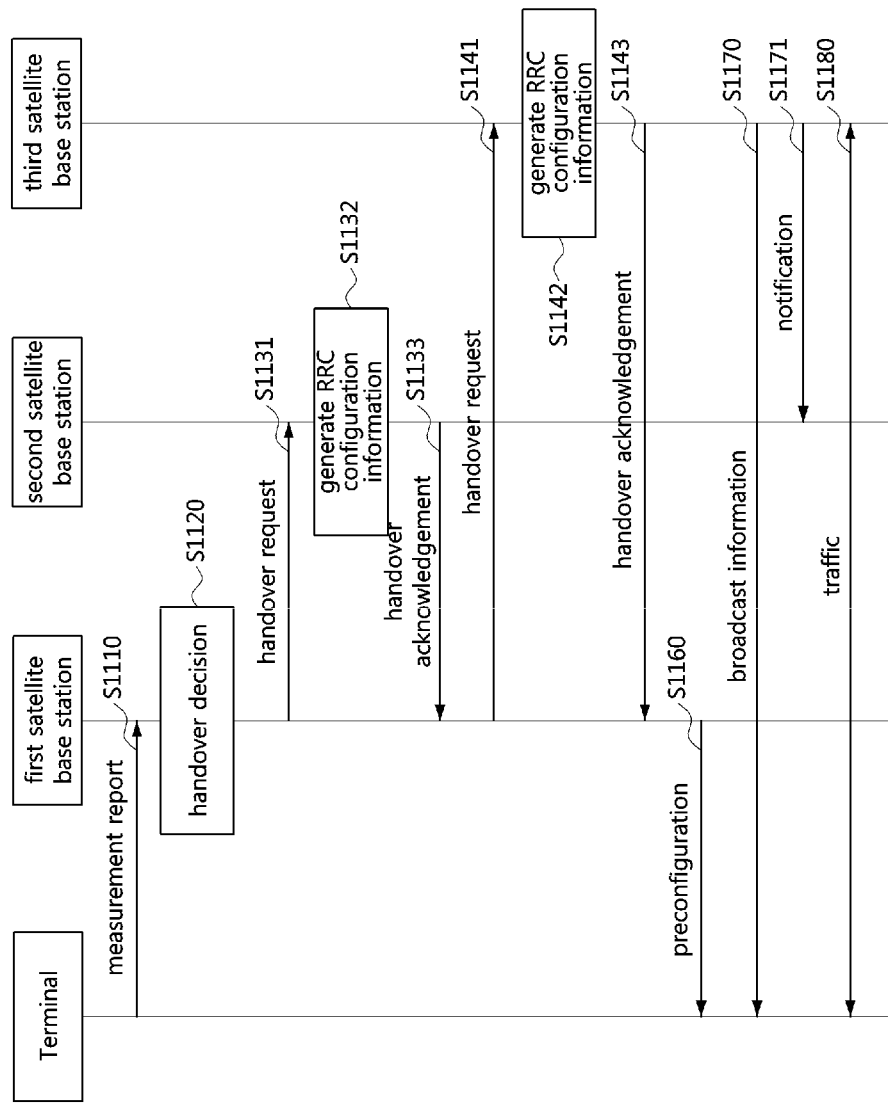
FIG. 11 is a sequence chart illustrating a handover method for a mobile satellite base station according to yet another exemplary embodiment of the present disclosure.

FIG. 11 is a sequence chart illustrating a handover method for a mobile satellite base station according to yet another exemplary embodiment of the present disclosure.

The serving base station (e.g., satellite base station #1) may configure a plurality of target base station candidates (e.g., satellite base stations #2 and #3) to the terminal in consideration of location information, moving speed, and signal strength information of the terminal, which are included in a measurement report, the orbit information of the satellite base stations, and the mobility of the terminal. For example, there may be a situation in which there are a plurality of target base station candidates that are expected to provide services for the terminal by being located at a boundary area of the cell.

The terminal may perform handover setup procedures for the target base stations (i.e., satellite base stations #2 and #3) according to the satellite orbit information with the satellite base station #1, which is the current serving base station (S1110 to S1160). That is, the steps S1110 and S1120 may be performed in the same manner as in the steps S910 and S920 of FIG. 9. The steps S1131 to S1133 may be performed in the same manner as in the steps S930 to S950 of FIG. 9, and the steps S1141 to S1143 may also be performed in the same manner as in the steps S930 to S950 of FIG. 9. On the other hand, the step S1160 is similar to the step S960 of FIG. 9, but unlike the step S960 of FIG. 9, it is different from the step S960 of FIG. 9 in that the connection configuration information and activation time of the two satellite base stations (i.e., satellite base stations #2 and #3) are transmitted to the terminal.

The terminal may receive information (e.g., PCID or satellite identification information included system information) from the satellite base station #3 at the activation time configured through the step S1160. In this case, the terminal may exchange traffic with the satellite base station #3 without an additional control signaling procedure for handover (S1180).

Meanwhile, the terminal may transmit information of the another previously-configured target base station (i.e., satellite base station #2) to the satellite base station #3 which is the current serving base station, and the satellite base station #3 which is the current serving base station may inform the another previously-configured target base station (i.e., satellite base station #2) that the terminal is connected to itself (i.e., that the handover to the satellite base station #2 is not executed) (S1171). Also, the terminal may exchange traffic with the current serving base station (satellite base station #3). Meanwhile, although FIG. 11 shows that the step S1180 is performed after the step S1171, the steps S1180 and S1171 may be simultaneously performed, or after the step S1180, the step S1171 may be performed.

Apparatuses According to the Exemplary Embodiments

Figure 12:
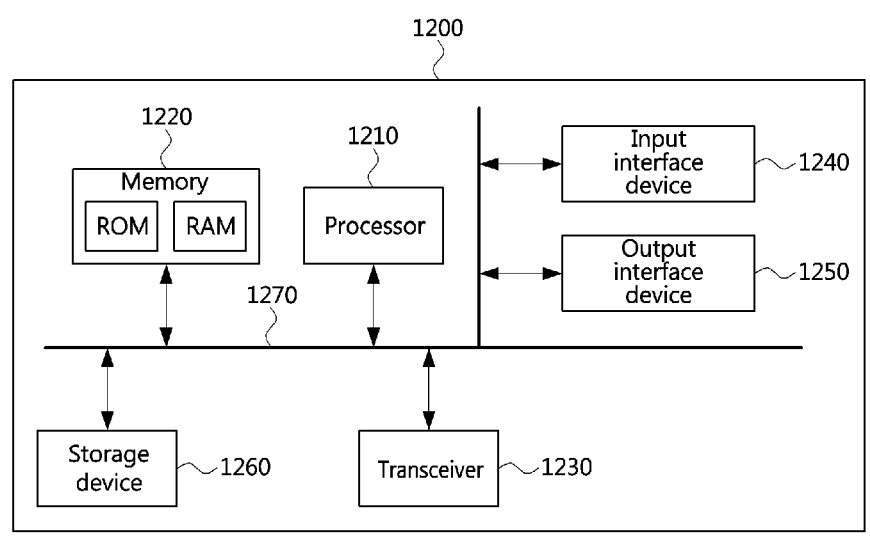
FIG. 12 is a block diagram illustrating a communication node according to exemplary embodiments of the present disclosure.

FIG. 12 is a block diagram illustrating a communication node according to exemplary embodiments of the present disclosure.

The communication node illustrated in FIG. 12 may be a terminal or a base station for performing the methods according to the exemplary embodiments of the present disclosure.

Referring to FIG. 12, a communication node 1200 may include at least one processor 1210, a memory 1220, and a transceiver 1230 connected to a network to perform communications. In addition, the communication node 1200 may further include an input interface device 1240, an output interface device 1250, a storage device 1260, and the like. The components included in the communication node 1200 may be connected by a bus 1270 to communicate with each other. However, each component included in the communication node 1200 may be connected to the processor 1210 through a separate interface or a separate bus instead of the common bus 1270. For example, the processor 1210 may be connected to at least one of the memory 1220, the transceiver 1230, the input interface device 1240, the output interface device 1250, and the storage device 1260 through a dedicated interface.

The processor 1210 may execute at least one instruction stored in at least one of the memory 1220 and the storage device 1260. The processor 1210 may refer to a central processing unit (CPU), a graphics processing unit (GPU), or a dedicated processor on which the methods according to the exemplary embodiments of the present invention are performed. Each of the memory 1220 and the storage device 1260 may be configured as at least one of a volatile storage medium and a nonvolatile storage medium. For example, the memory 1220 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A handover method performed by a terminal in a non-terrestrial network, the handover method comprising:
   transmitting a measurement report including measurement results for neighbor cells to a serving satellite base station;
   receiving, from the serving satellite base station, connection configuration information for at least one target base station candidate and information on an activation time when the connection configuration information for the at least one target base station candidate is activated;
   performing a handover to a first target base station candidate among the at least one target base station candidate based on information received from the at least one target base station candidate at the activation time; and
   transmitting information on a remaining target base station or remaining target base stations except the first target base station candidate among the at least one target base station candidate to the first target base station,
   wherein the first target base station notifies the remaining target base station or remaining base stations that the terminal is not handed over to the remaining target base station or remaining base stations.

2. The handover method according to claim 1, wherein the measurement report includes location information of the terminal, and the serving satellite base station determines the at least one target base station candidate based on the location information of the terminal and orbit information of neighbor satellite base stations.

3. The handover method according to claim 2, wherein the location information of the terminal is at least one of global positioning system (GPS) location information, assisted global navigation satellite system (A-GNSS) location information, information based on an observed time differential of arrival (OTDOA), and an enhanced cell ID (ECID).

4. The handover method according to claim 2, wherein the orbit information of the neighbor satellite base stations is ephemeris information of satellites on which the neighbor satellite base stations are mounted.

5. The handover method according to claim 1, wherein the handover to the first target base station candidate is performed without an additional control signaling for the handover.

6. The handover method according to claim 1, wherein the serving satellite base station and the at least one target base station candidate are moving beam type satellite base stations.

7. The handover method according to claim 1, wherein the activation time is represented using at least one of a system frame number (SFN), a coordinated universal time (UTC), and a GPS time.

8. A method of supporting a handover of a terminal, performed by a serving satellite base station in a non-terrestrial network, the method comprising:
- receiving a measurement report including measurement results for neighbor cells from the terminal;
- determining at least one target base station candidate based on the measurement report, and receiving connection configuration information from the at least one target base station candidate;
- transmitting, to the terminal, connection configuration information for the at least one target base station candidate and information on an activation time when the connection configuration information for the at least one target base station candidate is activated; and
- when reconnection configuration for maintaining connection is requested from the terminal, receiving information on the at least one target base station candidate from the terminal and notifying the at least one target base station candidate that the terminal is not handed over to the at least one target base station candidate.

9. The method according to claim 8, wherein the measurement report includes location information of the terminal, and the serving satellite base station determines the at least one target base station candidate based on the location information of the terminal and orbit information of neighbor satellite base stations.

10. The method according to claim 9, wherein the location information of the terminal is at least one of global positioning system (GPS) location information, assisted global navigation satellite system (A-GNSS) location information, information based on an observed time differential of arrival (OTDOA), and an enhanced cell ID (ECID).

11. The method according to claim 9, wherein the orbit information of the neighbor satellite base stations is ephemeris information of satellites on which the neighbor satellite base stations are mounted.

12. The method according to claim 8, wherein the serving satellite base station and the at least one target base station candidate are moving beam type satellite base stations.

13. A handover method performed by a terminal in a non-terrestrial network, the handover method comprising:
- transmitting a measurement report including measurement results for neighbor cells to a serving satellite base station;
- receiving, from the serving satellite base station, connection configuration information for a first base station and information on an activation time when the connection configuration information for the first base station is activated;
- when receiving information of a second base station that is different from the first base station at the activation time, performing a handover to the second base station by proceeding with a connection configuration procedure with the second base station; and
- transmitting information on the first base station to the second base station, wherein the second base station notifies the first base station that the terminal is not handed over to the first base station based on the information on the first base station.

14. The handover method according to claim 13, wherein the measurement report includes location information of the terminal, and the serving satellite base station determines the first base station based on the location information of the terminal and orbit information of neighbor satellite base stations.

15. The handover method according to claim 14, wherein the location information of the terminal is at least one of global positioning system (GPS) location information, assisted global navigation satellite system (A-GNSS) location information, information based on an observed time differential of arrival (OTDOA), and an enhanced cell ID (ECID).

16. The handover method according to claim 14, wherein the orbit information of the neighbor satellite base stations is ephemeris information of satellites on which the neighbor satellite base stations are mounted.

17. The handover method according to claim 13, wherein the serving satellite base station, the first base station, and the second base station are moving beam type satellite base stations.

* * * * *